United States Patent
Penninger et al.

(10) Patent No.: US 6,959,637 B1
(45) Date of Patent: Nov. 1, 2005

(54) VACUUM BRAKE BOOSTER

(75) Inventors: William John Penninger, Niles, MI (US); Gary L. Doty, Berrien Springs, MI (US); Richard Becker McClain, South Bendprings, IN (US); John Edmund Mackiewicz, Niles, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/711,186

(22) Filed: Aug. 31, 2004

(51) Int. Cl.$^7$ ................................... F15B 9/10
(52) U.S. Cl. ..................... 91/369.2; 91/376 R
(58) Field of Search ............. 91/369.2, 376 R, 91/379, 381

(56) References Cited

U.S. PATENT DOCUMENTS

| | | | |
|---|---|---|---|
| 1,906,222 A | * | 5/1933 | Boland ........................ 188/360 |
| 3,083,698 A | | 4/1963 | Price |
| 3,517,588 A | | 6/1970 | Kytta |
| 3,760,693 A | | 9/1973 | Myers |
| 5,350,224 A | * | 9/1994 | Nell et al. ................ 303/113.3 |
| 5,518,305 A | * | 5/1996 | Jakobi et al. ............. 303/114.3 |
| 6,282,896 B1 | * | 9/2001 | Wachi et al. ............... 60/547.2 |
| 6,390,567 B1 | | 5/2002 | Hurlbutt |
| 6,739,234 B2 | | 5/2004 | Zinndorf et al. |

\* cited by examiner

*Primary Examiner*—Edward K. Look
*Assistant Examiner*—Michael Leslie
(74) *Attorney, Agent, or Firm*—Leo H McCormick, Jr.; Warren Comstock

(57) ABSTRACT

A control valve for a brake booster having a first member with a first bore, a second member located in the first bore and having a second bore, a plunger located in the second bore and connected to an input member. A gear fixed to the second member with teeth that engage a first rack retained in the first body and a stationary rack within the brake booster. A force applied to the input member controls the development of a pressure differential that moves a wall during a brake application. Movement of the wall causes a rotative torque to be transmitted from the first rack into teeth such that the gear moves with respect to the second rack and the second body to separates from the first body and as a result the travel of input member is less than the travel of the wall during a brake application.

25 Claims, 8 Drawing Sheets

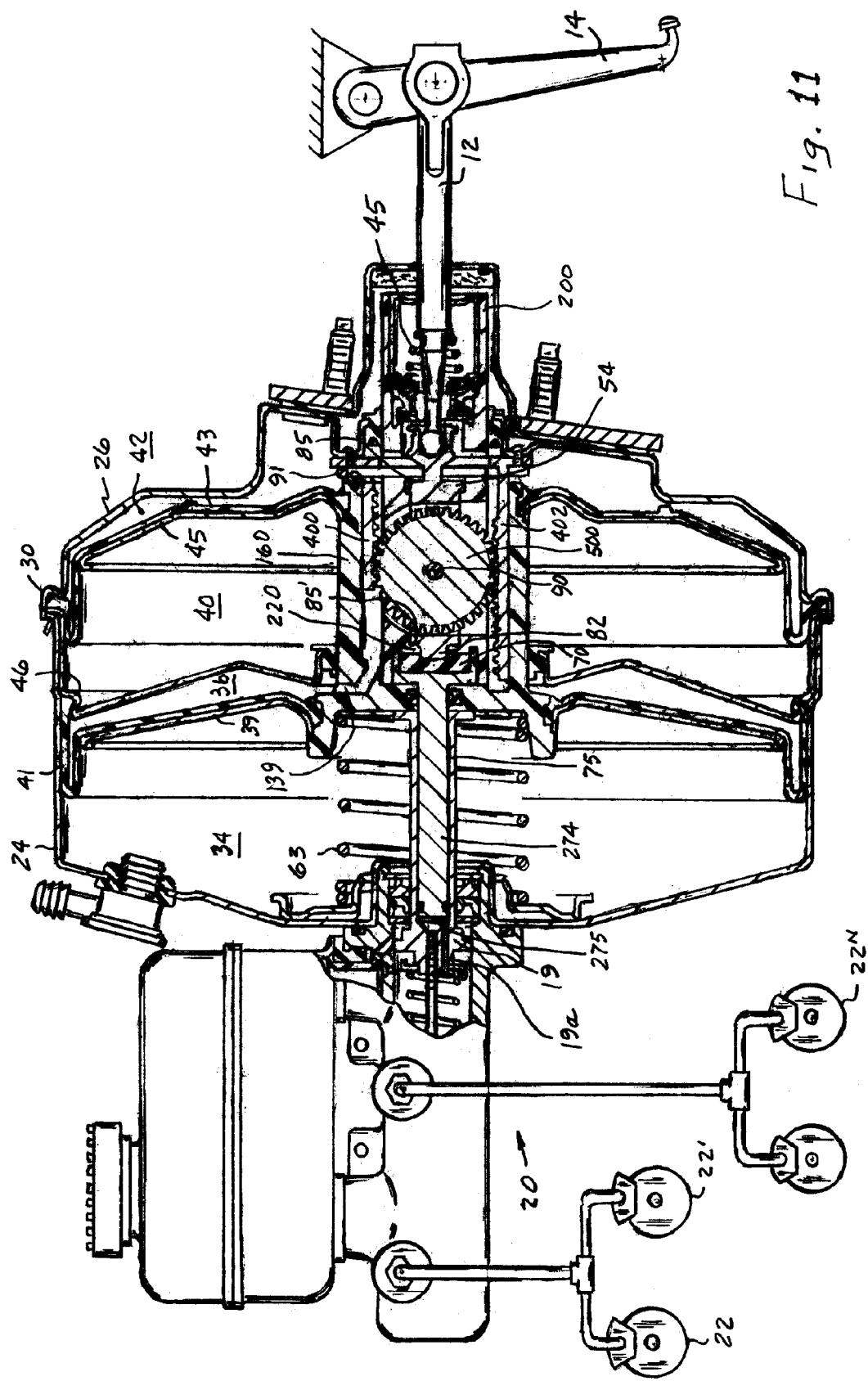

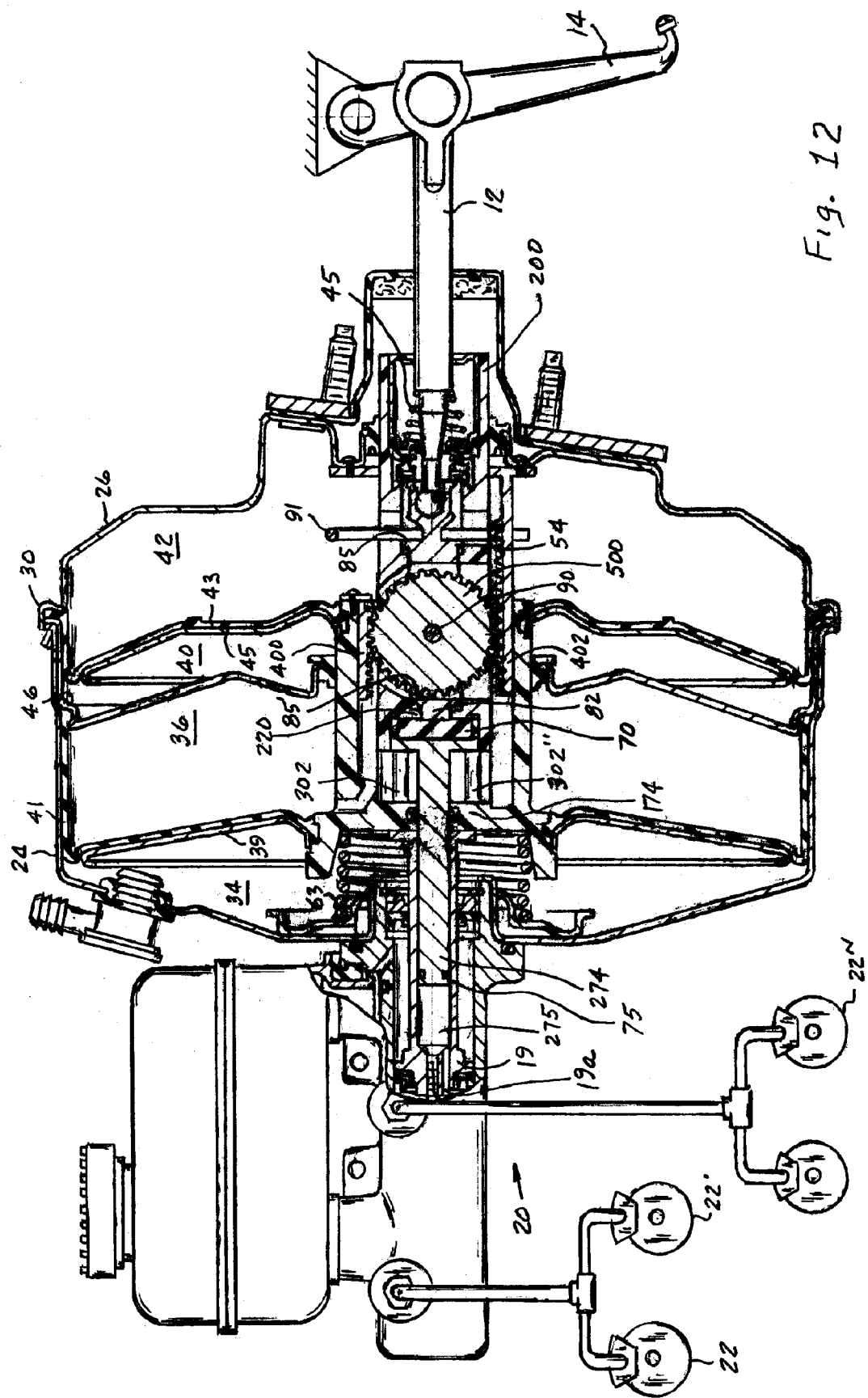

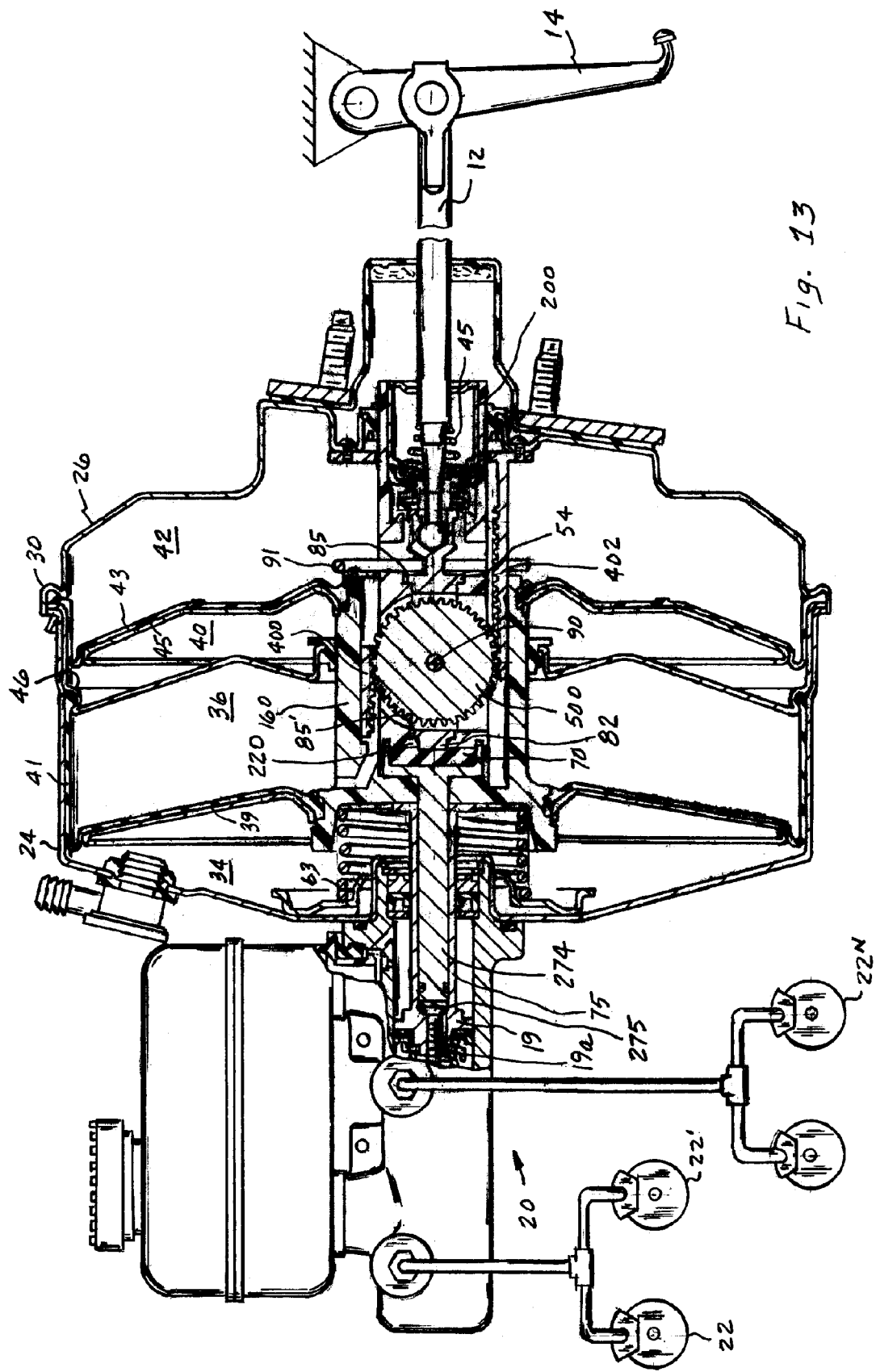

VACUUM BRAKE BOOSTER

This invention relates to a control valve having first and second cylindrical members that travel at different rates during a brake application such that the travel of the input member is less than travel of the output member.

BACKGROUND OF THE INVENTION

In the development of brake boosters it became evident that by dividing the interior cavity of a housing by two diaphragm members a resultant output force could be significantly increased. In some of the resulting tandem brake boosters such as disclosed U.S. Pat. No. 5,233,911 communication between the chambers is achieved through passages in a hub that retains a control valve that is responsive to an operator input for the development of a pressure differential across the diaphragms that separate a rear chambers from a front chambers while in other tandem brake boosters such as disclosed in U.S. Pat. Nos. 3,083,698; 3,517,588 and 3,760,693 the rear chambers are connected to each other through flow path created between a peripheral surface of a partition member and housing. A partition member that is usually made of a plastic material engages the hub to separates a front chamber from an adjacent rear chamber. In some of such boosters, the partition member may move or float within the interior cavity as a function of a pressure differential developed during a brake application. In any event, the hub moves from a position of rest within the housing to an actuation position that is in a direct relationship to the movement of the plunger by the input force. Thus, when an operator applies an input force on the brake pedal, the arcuate travel of the brake pedal is translated into linear movement of the plunger. Unfortunately a desired brake force may not always be achieved if a total linear travel of the plunger occurs prior to the ultimate arcute travel of the brake pedal as manual input is not added to the output force when a maximum boost assist is reached.

SUMMARY OF THE INVENTION

An advantage of the present invention resides a brake booster having a control valve arrangement wherein the travel of a plunger in response to an input force from an input member in the development of an output force is about one-half the travel of an output member for pressurizing fluid in a master cylinder to effect a brake application.

According to this invention, a hub for a wall arrangement that separate the interior of the housing of a brake booster into first and second chambers is defined by concentric first and second cylindrical members. The first cylindrical member has a first stepped bore therein that receives the second cylindrical member while the second cylindrical member has a second stepped bore for receiving a plunger that is connected to a brake pedal. The first cylindrical member has first and second longitudinal slots adjacent the first stepped bore that extend from a first end toward a second end and passages therein that connect the first and second chambers. The second cylindrical member has third and fourth longitudinal slots that extend from the second cylindrical bore and first and second openings that are normal to the third and fourth longitudinal slots. A gear has an axle that is fixed in the first and second openings in the second cylindrical member with a first plurality of teeth that extend through the third longitudinal slot and engage a first rack retained in the first longitudinal slot in the first cylindrical member and a second plurality of teeth that extend through the fourth longitudinal slot and engage a second rack that is located within the second longitudinal slot and fixed to the housing for the brake booster. The plunger has a fifth longitudinal slot that is located between a first end thereof and second end thereof with first and second longitudinal oval openings normal to the fifth longitudinal slot. The axle of the gear extends through the oval openings such that plunger may independently move within the second stepped bore without movement of either the first or second cylindrical members. An input force applied to the input member moves the plunger to allow a pressure differential to be established across the wall arrangement and develop an output force that moves the wall arrangement and first cylindrical member. The output force is directly applied from the first cylindrical member to a first piston that is located in a bore of a master cylinder to pressurize fluid therein and creating operational pressurizing fluid that is supplied to the wheel brakes of a vehicle to effect a brake application. The first piston has a bore therein that retains a second piston connected through a reaction disc located in the second stepped bore adjacent an end of the plunger. The operational pressurized fluid acts on the second piston to oppose the input force and when in balance with the input force terminates the communication of air to the rear chambers in the development of the pressure differential. When the first cylindrical member moves the first rack transmits a torque through the first rack into the first plurality of teeth such that the gear rotates and moves the second plurality of teeth on the second rack such that the second cylindrical body to moves away or in an opposite direction with respect to the first cylindrical member and as a result the travel of input member is less than the travel of the wall during the brake application.

An advantage of this invention resides in a control valve arrangement wherein an output force produced in response to a pressure differential developed across a wall is proportional to an input force and yet the travel associated with an output member is less than the travel of an input member.

A further advantage of this invention resides in an ability to select a travel relationship between an input member and an output member as a function of a pitch between a gear and a rack arrangement.

BRIEF DESCRIPTION OF THE DRAWINGS

FIG. 11 is a sectional view of the brake booster of FIG. 1 showing the relationship of the components of the control valve arrangement at the initiation of a brake application;

FIG. 12 is a sectional view of the brake booster of FIG. 1 showing the relationship of the components of the control valve arrangement during a brake application; and FIG. 13 is a sectional view of the brake booster of FIG. 1 showing the relationship of the components of the control valve arrangement during a manual brake application.

DETAILED DESCRIPTION OF THE INVENTION

Figure 1:
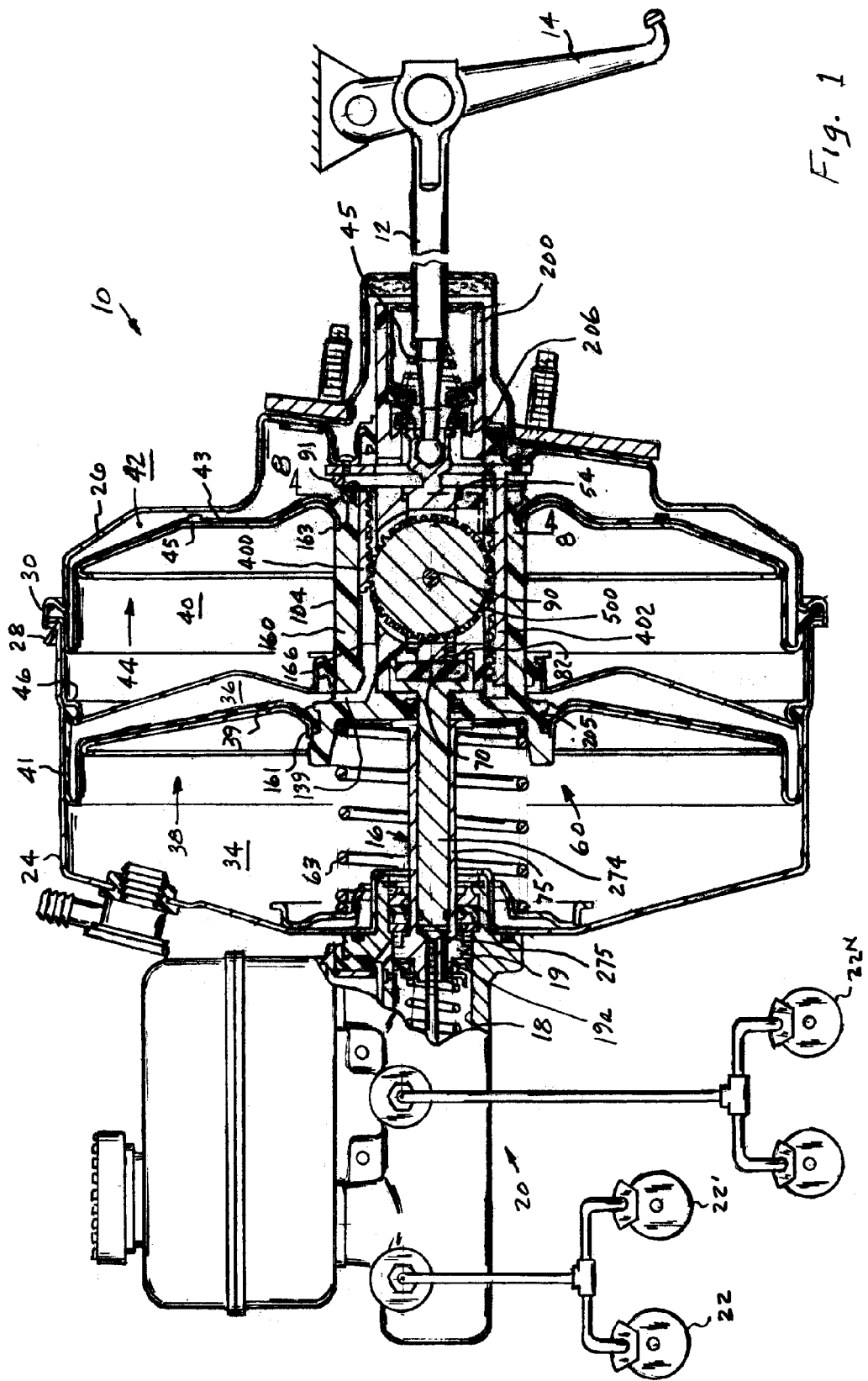
FIG. 1 is a sectional view a brake booster for a brake system having a valve arrangement assembly made according to the principals of the present invention.

The brake booster 10 shown in FIG. 1 is made according to the present invention and is distinguished in that linear travel of an input member 12 in response to an input force applied to brake pedal 14 is less than and preferably about one half of the travel of an output member 16 in applying an operational force to pistons 19 (only one is shown) in a bore 18 of master cylinder 20 to develop operational pressurized fluid that is supplied to a plurality of wheel brakes 22,22' . . . 22" to effect a desired brake application.

The brake booster 10 has a housing produced by fixing a front shell 24 to a rear shell 26 by rolling a lip 28 on the rear shell 26 over an annular flange 30 on the front shell 24 to create a unitary structure of a type illustrated in U.S. Pat. No. 6,390,567. In fixing the front shell 24 to the rear shell 26 an interior cavity is created and separated into a first chamber 34 and a second chamber 36 by a first diaphragm assembly 38 and into a third chamber 40 and a fourth chamber 42 by a second diaphragm assembly 44. The second chamber 36 is separated from the third chamber 40 by a partition member 46 that has a peripheral surface that engages the rear shell 26 and an inner surface that sealingly contacts a peripheral surface 104 on a first cylindrical member 160 of a hub arrangement 60.

Figure 2:
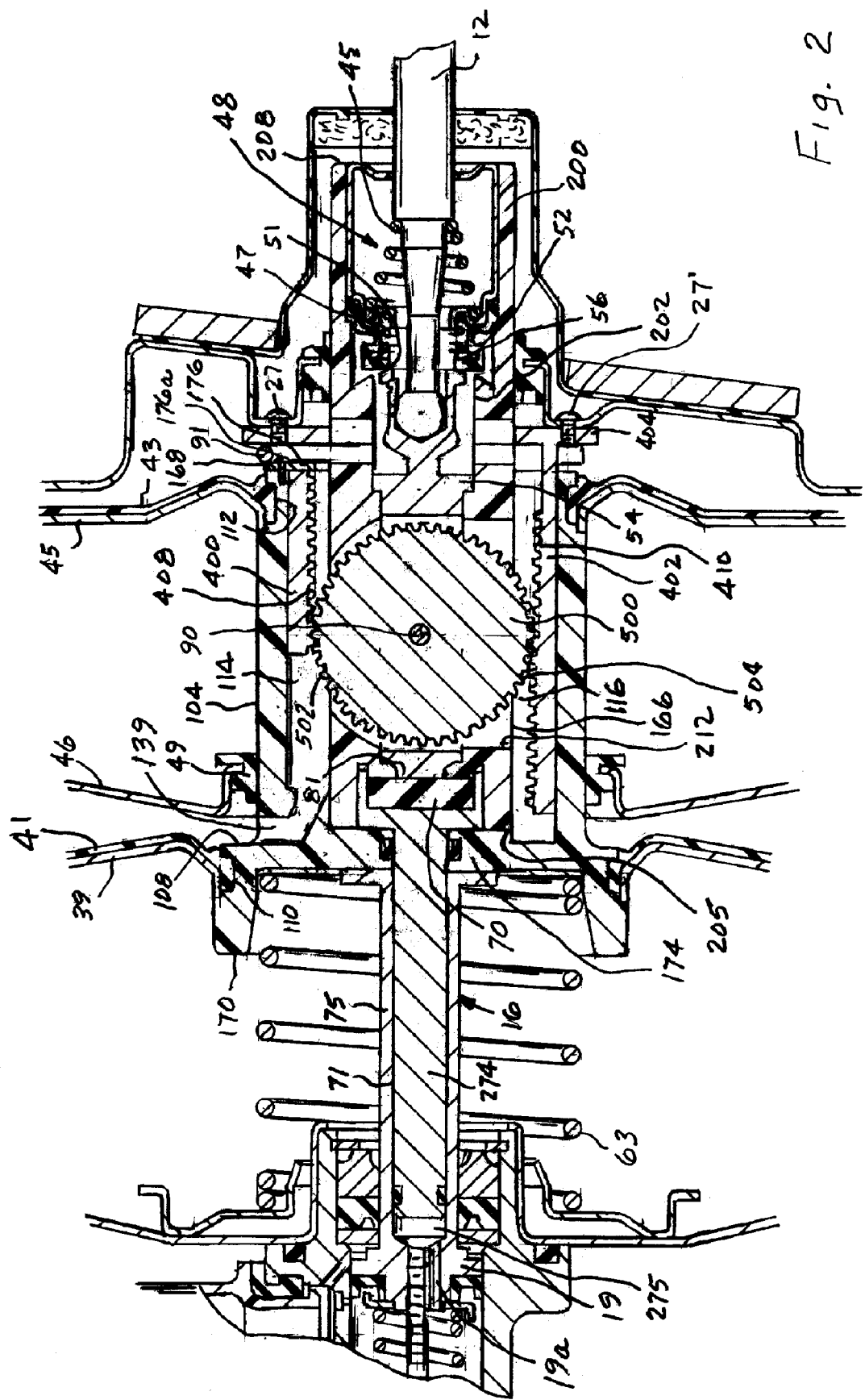
FIG. 2 is an enlarged sectional view of the valve arrangement of FIG. 1.
Figure 3:
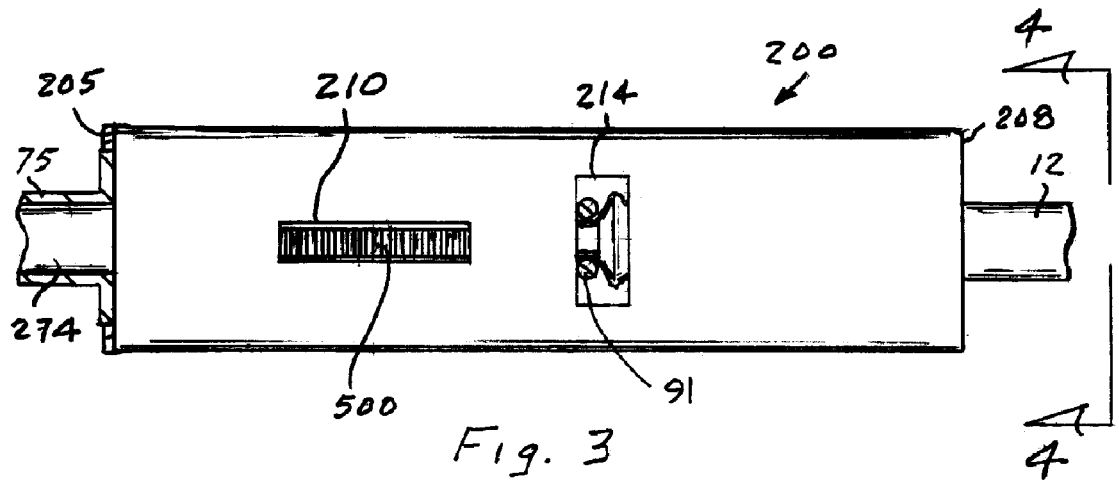
FIG. 3 is a top view of an internal cylindrical member that retains a plunger for the control valve of FIG. 1.
Figure 5:
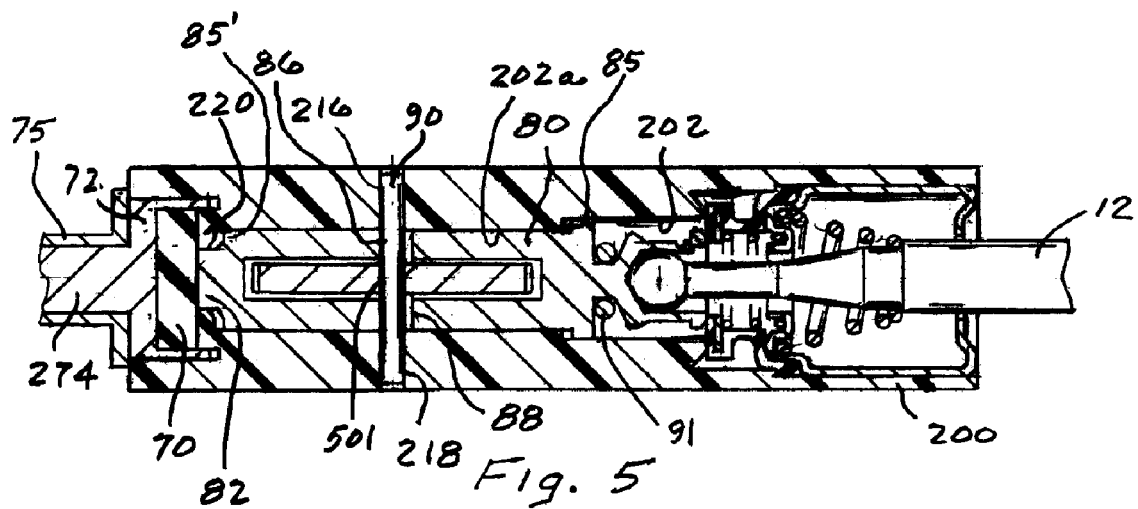
FIG. 5 is a sectional view taken along line 5—5 of FIG. 4.
Figure 4:
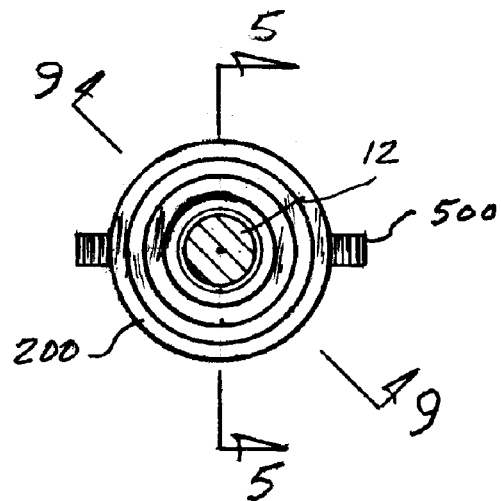
FIG. 4 is an end view of the cylindrical member and plunger of FIG. 3.

The first diaphragm assembly 38 includes a resilient member 41 that has a first bead that is sealingly secured to the partition member 46 and a second bead that holds a backing plate 39 against a first shoulder 161 on the first cylindrical member 160, see FIG. 2. The second diaphragm assembly 44 is similar to the first diaphragm assembly 38 in that a resilient member 43 has a first bead sealingly secured between the front shell 24 and rear shell 26 and a second bead that holds a backing plate 45 against a second shoulder 163 on the first cylindrical member 160. The first chamber 34 is permanently connected to the third chamber 40 by a first passage 162,162' in the first cylindrical member 160 while the second chamber 36 is permanently connected to the fourth chamber 42 by a passage 164,164' in the first cylindrical member 160, see FIG. 8. The first cylindrical member 160 has a stepped bore 166 therein that extends from a first end 168 to a second end 170 and is designed to receive a second cylindrical member 200. The second cylindrical member 200 has an axial bore 202 therein and a plurality of passages 204, 204' . . . 204" that extends from a first end 205 to a vacuum seat 206 that is located a distance from a second end 208, see FIGS. 3,5,8,9 and 10. A tubular arrangement 300 that includes a plurality of tubes 302,302' . . . 302" each have an annular flange 304 that is retained in a seat 172 in openings in annular rib 174 on the second end 170 of the first cylindrical member 160. The plurality of tubes 302,302' . . . 302" sealingly extends into the plurality of passages 204,204' . . . 204" such that the first chamber 34 is in constant communication to the vacuum seat 206 and as a result the first chamber 34 may be selectively connected to the fourth chamber 42 and ultimately to the second chamber 36 through passage 164 in response to actuation of control valve 48 that is located in axial bore 202.

The control valve 48, see FIG. 2, includes a poppet member 52 and a plunger 54 that is connected to push rod 12 to receive an input force from brake pedal 14. The plunger 54 being retained in bore 202 by a key 91 while the poppet member 52 has a first end that is fixed to the second cylindrical member 200 and a flexible annular face 56 that is urged toward vacuum seat 206 by a first spring 47 while a second spring 45 acts on the push rod 12 to urge the plunger 54 toward an atmospheric seat 51 on face 56 of the poppet member 52.

In response to an input force applied by an operator to brake pedal 14, push rod 12 moves such that spring 47 urges face 56 into engagement with vacuum seat 206 on the second cylindrical member 200 to interrupt normally opened communication of fluid in the first chamber 34 through the passages 204,204' . . . 204" and thereafter moves plunger 54 away from atmospheric seat 51 to allow air from the surrounding environment to be communicated to the rear or second 36 and fourth 42 chambers by way of stepped bore 202 and passage 164,164'. Air supplied to chambers 36 and 42 creates a pressure differential with vacuum permanently available in chambers 34 and 40 such that an output force is created across the first 38 and second 44 diaphragm assemblies. This output force is carried through the first 38 and second 44 diaphragm assemblies into the first cylindrical member 160 and after overcoming return spring 63 directly provides output member 16 with an operational force that moves pistons 19 and pressurizes fluid in bore 18 of the master cylinder 20 to an operational fluid pressure commensurate with the input force applied to brake pedal 14 to effect a brake application in wheel brakes 22,22' . . . 22". The travel of push rod (input member) 12 in positioning the control valve 48 to develop the operational force to move push rod (output member) 16 and pressurize fluid in the master cylinder is less than and preferably about one half the travel of push rod (output member) 16 in effecting the brake application.

In more particular detail, the first cylindrical member 160 and second cylindrical member 200 define a hub for the first 38 and second 44 diaphragm assemblies and are distinguished in that the first cylindrical member 160 moves at a different rate of travel during a brake application than the second cylindrical member 200 with the rate being established as a function of a relationship between first 400 and second 402 racks that are retained in the first cylindrical member 160 and a gear 500 that is fixed to the second cylindrical member 200.

Figure 8:
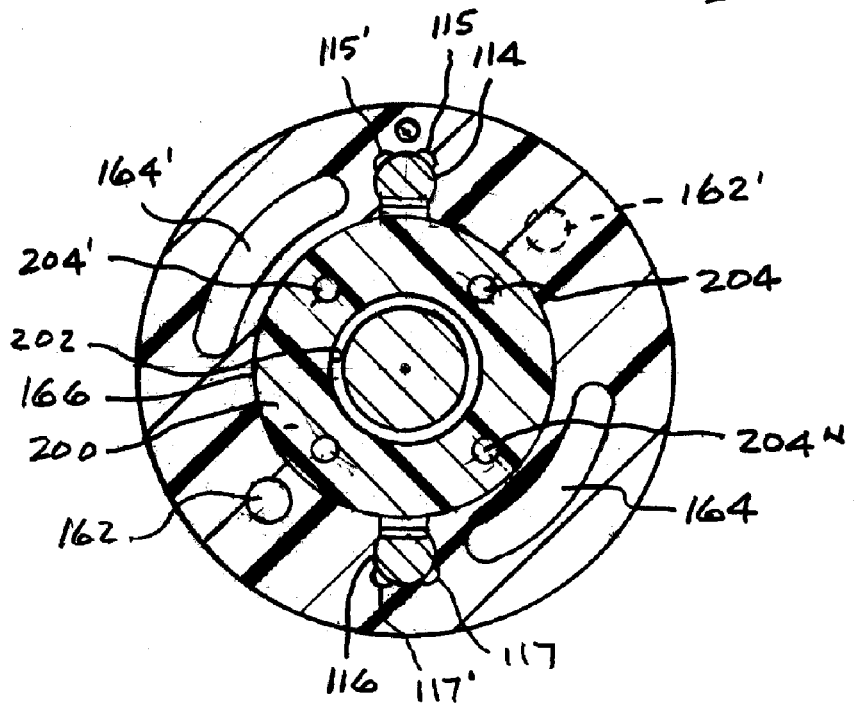
FIG. 8 is a sectional view taken along lines 8—8 of FIG. 1.
Figure 9:
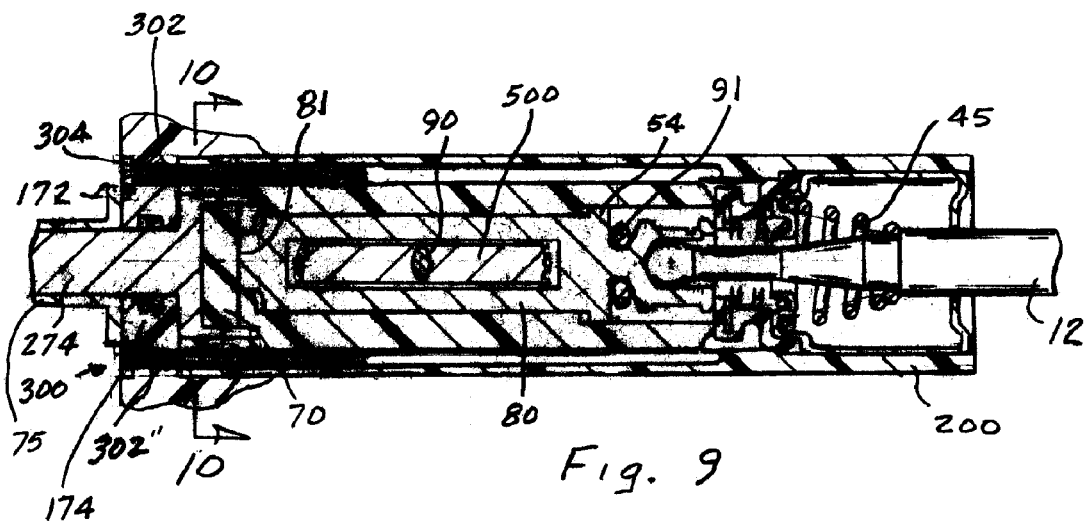
FIG. 9 is a sectional view taken along lines 9—9 of FIG. 4.
Figure 10:
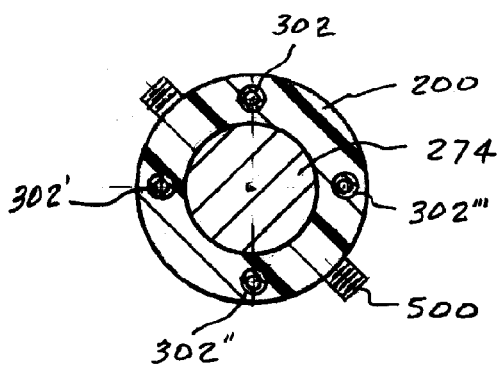
FIG. 10 is a sectional view taken along lines 10—10 of FIG. 9.

The first cylindrical member 160 has a peripheral surface 104 with a uniform diameter that extends from the first end 168 to a shoulder 108 adjacent a second end 170 that is engaged by seal 49 on partition member 46, as shown in FIG. 2. A bead on diaphragm 41 and a surface of backing plate 39 of the first diaphragm assembly 38 are retained in a groove 110 on the first cylindrical member 160 while a bead on diaphragm 43 and a surface of backing plate 45 are retained in a groove 112 of the first cylindrical member 160. A stepped bore 166 extends from the first end 168 to the second end 170 while first 114 and second 116 longitudinal slots radiate from the first stepped bore 166 and extend from the first end 168 toward the second end 170, see FIGS. 2 and 8. As best shown in FIG. 8, the first 114 and second 116 longitudinal slots may also have first 115,115' and second 117,117' longitudinal slots for connecting the first end 168 and chamber 42 with chamber 36 by way of a radial opening 39 that is located adjacent shoulder 108 on the second end 170.

The first slot 114 in cylindrical member 160 receives a first rack 400 that is free to move therein but is restricted from moving past end 168 by a clip or tab 176 that is fixed to the first cylindrical member 160 by a screw 176a. The second slot 116 also receives a second rack 402 that has a first end with an annular flange 404 that is fixed to the rear shell 26 by screws 27,27'. Thus, the first rack 400 is free to move within the first slot 114 while the second rack 402 is fixed and stationary within the cavity.

The second cylindrical member 200 is further defined by essentially a uniform diameter on a peripheral surface that extends from a first end 205 to a second end 208, this peripheral surface is concentric to diameter 166 on cylindrical member 160 such that the second cylindrical member 200 may move freely move within diameter 166, see FIGS. 2,3,4,5,8,9 and 10. The stepped bore 202 is located on the axis of the second cylindrical member 200 and extends between the first 205 and second 208 ends has third 210 and fourth 212 longitudinal slots that extend from the second stepped bore 202. The third 210 and fourth 212 longitudinal slots are located in a same radial plane and are located near the first end 205 and between a key slot 214 and the second end 208. The cylindrical member 200 has first 216 and second 218 lateral openings therein with respect to the axis of the second cylindrical member 200 that are normal to third 210 and fourth 212 longitudinal slots. An internal annular rib 220 adjacent the first end 205 defines a face for receiving a resilient or reaction disc 70 that is retained in a head 72 on a shaft 274 that is located within an axial bore 71 of shaft 75 of the output member 16.

Figure 6:
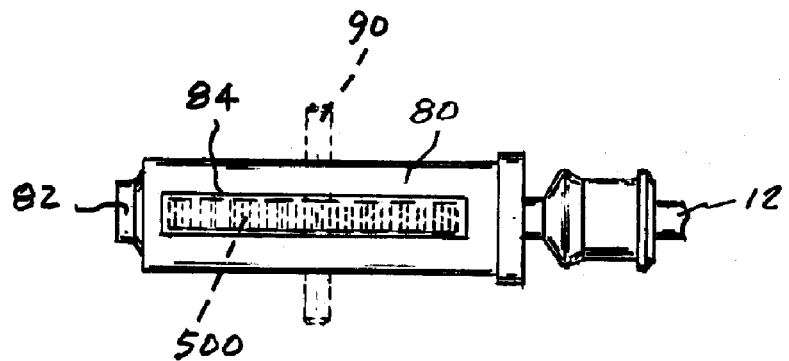
FIG. 6 is a top view of a plunger that is retained in the cylindrical member of FIG. 3.
Figure 7:
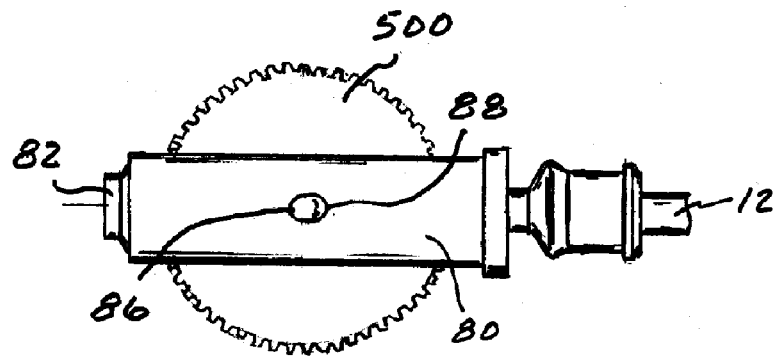
FIG. 7 is a side view of the plunger of FIG. 6.

Plunger 54 of the control valve 48 that is located in axial bore 202 of the second cylindrical member 200 and as best illustrated in FIGS. 2, 5,6 and 7 is further defined by a shaft extension 80 that is located in diameter 202a of the second stepped bore 202. The end 82 of shaft extension 80 is positioned adjacent the first end 205 of the second cylindrical member 200 and designed to engage reaction disc 70. As illustrated in FIG. 6, shaft extension 80 has a fifth longitudinal slot 84 therein, see FIGS. 5 and 7, with first 86 and second 88 lateral oval openings that extend from and are normal to the fifth longitudinal slot 84 and a shoulder 85. The fifth longitudinal slot 84 receives a gear 500 that connects the first rack 400 to the second rack 402.

Gear 500 has an axle 501 that is aligned with the first 216 and second 218 lateral openings in the second cylindrical member 200 and with the first 86 and second 88 oval openings in shaft extension 80 of plunger 54. A pin 90 passes through first 86 and second 88 oval openings and is retained in the axle 501 and first 216 and second 218 lateral openings in the second cylindrical member 200 such that teeth 502 on a peripheral surface of gear 500 extend through the third 210 and fourth 212 longitudinal slots and into the first 114 and second 116 longitudinal slots. A first plurality of teeth 502 on gear 500 engage teeth 408 on the first rack 400 located in the first longitudinal slot 114 while a second plurality of teeth 504 on gear 500 engage teeth 410 on the second rack 402 located in the second longitudinal slot 116. The sides of the gear 500 engaging the side of the first 114 and second 116 slots such that gear 500 is aligned in a vertical plane along the axis of the input member or push rod 12 that is axially aligned with the output member 16.

The output member 16 is distinguished in that shaft 75 that extends from piston 19 engages rib 174 on the first cylindrical member 160 and moves the piston 19 at a same rate of travel as the first cylindrical member 160 to communicate an output force for pressurizing fluid in bore 18 of the master cylinder 20 to effect a brake application. The piston 19 has a passage 19a through which the fluid in bore 18 is communicated to a reaction chamber 275 formed in bore 71 through the engagement of shaft 274 with shaft 75.

OPERATION OF THE BRAKE BOOSTER

When an operator desires to effect a brake application for a vehicle equipped with brake booster 10 an input force is applied to brake pedal 14 that moves push rod 12 such that spring 47 urges face 56 into engagement with vacuum seat 206 on the second cylindrical member 200 to interrupt normally opened communication of fluid in the first chamber 34 through the passages 204,204' . . . 204$^n$ and thereafter moves plunger 54 away from atmospheric seat 51 to allow air from the surrounding environment to be communicated to the rear or second 36 and fourth 42 chambers by way of stepped bore 202 and passages 164,164'. Initially shaft extension 80 moves with respect to pin 90 as the oval slots 86,88 have a length that allows closure of the vacuum seat 206 and the opening of the atmospheric seat 51 before movement of either the first cylindrical member 160 or second cylindrical member 200. With air being supplied to chambers 36 and 42 and a pressure differential is created across the walls, defined by the first 38 and second 44 diaphragm assemblies, with vacuum permanently available in chambers 34 and 40 to create an output force. The output force is carried through the first 38 and second 44 diaphragm into the first cylindrical member 160 and after overcoming return spring 63, the first cylindrical member 160 and piston 19 move at a same rate of travel to pressurize fluid in bore 18 of the master cylinder 200 and create an operational fluid pressure commensurate with the input force applied to brake pedal 14 to effect a brake application in wheel brakes 22,22' . . . 22$^n$. When the first cylindrical member 160 begins to move, the end of rack 400 engages clip or tab 176 and teeth 408 on the first rack 400 engage teeth 502 on gear 500 to impart a rotative torque to gear 500 that causes teeth 504 to move on teeth 410 of the second rack 402. With the axle 501 of gear 500 fixed to the second cylindrical member 200 movement or travel of the axle 501 and also the second cylindrical member 200 is a function of a ratio of the radius of the gear 500 divided by the diameter or one half the travel of the first cylindrical member 160, in any event the travel of the first cylindrical member 160 and the second cylindrical member 200 are different. Preferably the travel of the input member or push rod 12 is about one half the travel of the out put member or push rod 16 such that now a force required to pressurize fluid in a master cylinder is not limited by the travel of the brake pedal 14 in moving the input rod 12. Functionally, whenever piston 19 moves in bore 18 operational pressurized fluid is produced and in addition to being supplied to the wheel brakes is also communicated to the reaction chamber 275 to act on shaft 274. The operational pressurized fluid acting on shaft 274 provides a reaction force that acts on reaction disc 70 to press against face 81 of shaft extension 80 and oppose the input force applied to plunger 54 such that the resulting output force is matched with the input force in effecting a brake application. When the input force is removed from the input member 12, return spring 63 acts on the first cylindrical member 160 to return the first 38 and second 44 diaphragm assemblies to the position of rest shown in FIGS. 1 and 2.

During a brake application should a maximum pressure differential be utilized, a manual input applied to the input member 12 may further act on plunger 54 to move plunger extension 80 within bore 202a such that end 82 engages reaction disc 70 and moves shaft 274 within bore 71 to pressurize fluid in reaction chamber 275 to provide additional pressurization of the operational fluid supplied to the wheel brakes 22,22' . . . 22".

In an event where vacuum may not be available or present in the first 34 and third 40 chambers, a manual application may be achieved through the application of an input force applied to the brake pedal 14. In this situation, plunger 54 moves in axial bore 202 as before but without vacuum present in the first 34 and third 40 chambers a pressure differential is not created across the first 38 and second 44 diaphragm assemblies and as a result the first cylindrical member 160 does not independently move. However, when plunger 54 and shaft extension 80 have moves a distance equal to the length of oval slots 86 and 88, shoulders 85,85' engage the second cylindrical member 200 and provide a force that causes gear 500 to rotate as teeth 504 move on teeth 410 on the second rack 402 while teeth 502 engage teeth on teeth 408 on the first rack 400 and move then in linear slot 114 to a position as illustrated in FIG. 13 such that an input force is transmitted into the output member 16 to effect a brake application.

What is claimed is:

1. A brake booster having a wall that moves within a cavity of a housing in response to a pressure differential to produce an output force as a function of an input force communicated from an input member to a control valve arrangement, said output force being transmitted through a hub for said wall to an output member to effect a desired brake application, said brake booster being characterized in that said hub includes a first cylindrical member having a first stepped bore that extends between a first end and a second end for receiving a second cylindrical member with a second stepped bore therein that extends between a first end to a second end, said first stepped bore having first and second longitudinal slots that extend from said first end toward said second end, said second cylindrical member having third and fourth longitudinal slots there through that extend from said second stepped bore and are located in a same plane between said first end and said second end thereof, said second cylindrical member having first and second lateral openings with respect to the axis of said second cylindrical member and that are normal to said third and fourth longitudinal slots; a plunger of said control valve arrangement having a shaft that is located in said second stepped bore with a first end positioned adjacent said second end of said second cylindrical member, said shaft having a fifth longitudinal slot there through and first and second lateral oval openings that extend from and are normal to said fifth longitudinal slot, a gear having an axle aligned with said first and second lateral openings in said second cylindrical member and with said first and second oval openings in said plunger, a pin that passes through said first and second oval openings and is retained in said first and second lateral openings such that teeth on a peripheral surface of said gear extend through said third and fourth longitudinal slots and into said first and second longitudinal slots, a first rack located in said first longitudinal slot and engaging a first plurality of said teeth on said gear and a second rack located in said second longitudinal slot and engaging a second plurality of said teeth on said gear, said second rack being fixed to said housing while a clip member attached to said first cylindrical member provides a stop to prevent said first rack from moving past said first end of said first cylindrical member, said first cylindrical member and said wall moving together during a brake application such that on said first rack engaging said clip a rotative torque is imparted to said first plurality of teeth of said gear that causes said gear to rotate about said pin and move said second plurality of teeth with respect to said second rack such that said second cylindrical member separates from said first cylindrical member and as a result the travel of said input member is about one-half of the travel of said output member.

2. The brake booster as recited in claim 1 wherein said output member is characterized by a first piston that is directly connected to said first cylindrical member and located in a bore of a master cylinder for creating operational pressurizing fluid in a pressurizing bore of the master to effect a brake application.

3. The brake booster as recited in claim 2 wherein said first piston is characterized by an axial bore that is connected to said pressurizing bore in said master cylinder and receives operational pressurized fluid from which a reaction force is created to oppose the input force applied to the input member.

4. The brake booster as recited in claim 3 wherein said brake booster is further characterized by a second piston that is located in said axial bore of said first piston and receives said operational pressurized fluid from which a reaction force is created that acts on the first end of said second cylindrical member to oppose the input force during a brake application.

5. The brake booster as recited in claim 4 wherein said brake booster is further characterized by a reaction disc that is located in said first stepped bore between said second piston and the first end of said second cylindrical member to uniformly oppose the input force.

6. The brake booster as recited in claim 5 wherein said first and second oval openings have a length that corresponds to a distance that a seat on said plunger of the input member moves from a position of rest to an actuation position to allow air to be communicated to a chamber to create said pressure differential.

7. The brake booster as recited in claim 1 wherein said input force is carried into said gear through said pin to manually move said first cylindrical member to assist in effecting said brake application.

8. The brake booster as recited in claim 7 wherein said movement of said first cylindrical member through said pin causes said gear to rotate about said pin causing said first plurality of teeth to move said first rack into said first longitudinal slot while said second plurality of teeth move on said second rack such that said second cylindrical member remains engaged with said first cylindrical member and as a result the travel of said input member equals the travel of said output member.

9. The brake booster as recited in claim 7 wherein said input force acts through said second piston to pressurize operational fluid in said axial bore of said first piston to further pressurize the operational pressurized fluid during a brake application.

10. A brake booster having a wall that moves within a cavity of a housing in response to a pressure differential to produce an output force that is a function of an input force communicated from an input member to a control valve arrangement to effect a desired brake application, said brake booster being characterized in that said wall includes a first cylindrical member with a first stepped bore therein that receives a second cylindrical member with a second stepped bore therein that receives a plunger, said first cylindrical member having first and second longitudinal slots that extend from a first end of said first stepped bore toward a second end, said second cylindrical member having third and fourth longitudinal slots therein that extend from said second stepped bore between a first end and a second end thereof, said second cylindrical member having first and second lateral openings therein located along the axis of said second cylindrical member that are normal to said third and fourth longitudinal slots; said plunger having a shaft that is located in said second stepped bore with a reaction disc positioned adjacent said first second end of said second cylindrical member, said shaft having a fifth longitudinal slot there through with first and second lateral oval openings that extend from and are normal to said fifth longitudinal slot, a gear having an axle aligned with said first and second lateral openings in said second cylindrical body and with said first and second oval openings in said plunger, a pin that passes through said first and second oval openings and is retained in said first and second lateral openings such that teeth on a peripheral surface of said gear extend through said third and fourth longitudinal slots and into said first and second longitudinal slots, a first rack located in said first longitudinal slot and engaging a first plurality of said teeth on said gear and a second rack located in said second longitudinal slot and engaging a second plurality of said teeth on said gear, said second rack being fixed to said housing while said first rack engages a stop to retain said first rack in said first longitudinal slot, said first cylindrical member and said wall moving together during a brake application such that said first rack imparts a rotative torque through said first plurality of teeth on said gear that causes said gear to rotate about said pin and move said second plurality of teeth on said second rack such that said second cylindrical member separates from said first cylindrical member and as a result the travel of said input member is less than the travel of said output member.

11. The brake booster as recited in claim 10 wherein said output member is characterized by a first piston attached to said first cylindrical member and located in a bore of a master cylinder for creating operational pressurizing fluid in a pressurizing bore of the master to effect a brake application.

12. The brake booster as recited in claim 11 wherein said first piston is characterized by a passage that is connected to said pressurizing bore in said master cylinder to receive operational pressurized fluid from which a reaction force is created to oppose the input force applied to the input member.

13. The brake booster as recited in claim 12 wherein said brake booster is further characterized by a second piston that is located in said passage of said first piston that receives said operational pressurized fluid, said operational pressurized fluid acting on said second piston to produce said reaction force that acts on the second ends of said first and second cylindrical members to oppose the input force during a brake application.

14. The brake booster as recited in claim 13 wherein said brake booster is further characterized by a reaction disc that is located in said first stepped bore between said second piston and the first end of said first cylindrical member and said second end of said second cylindrical members to uniformly apply the reaction force between the first and second ends in opposing the input force.

15. The brake booster as recited in claim 14 wherein said first and second oval openings have a length that corresponds to a distance equal to a distance that a seat on said plunger of the input member moves from a position of rest to an actuation position where air is communicated to a chamber to create said pressure differential.

16. The brake booster as recited in claim 10 wherein said input force is carried into said gear through said pin to manually move said first cylindrical member and assist in effecting said brake application.

17. The brake booster as recited in claim 16 wherein said movement of said first cylindrical member through said pin causes said gear to rotate about said pin and said first plurality of teeth to move said first rack into said first longitudinal slot while said second plurality of teeth move on said second rack such that said second cylindrical member remains engaged with said first cylindrical member and as a result the travel of said input member is about equal to the travel of said output member.

18. A valve arrangement for a brake booster, said brake booster having a wall connected to a first cylindrical member having a first stepped bore therein, a second cylindrical member located in the first stepped bore and having a second stepped bore therein, a plunger located in the second stepped bore and connected to an input member, said first cylindrical member having first and second longitudinal slots that extend from a first end toward a second end thereon, said second cylindrical member having third and fourth longitudinal slots that extend from said second cylindrical bore, a gear fixed to the second cylindrical member and having a first plurality of teeth that extend through said third longitudinal slot and engage a first rack retained in said first longitudinal slot and a second plurality of teeth that extend through said fourth longitudinal slot and engage a second rack located within said second longitudinal slot, said second rack being fixed to a housing for the brake booster, said input member applying a force to move said plunger and control the development of a pressure differential that moves said wall to produce an output force that is used to effect a brake application, said wall on moving transmitting a torque through said first rack into said first plurality of teeth such that said gear rotates and moves said second plurality of teeth on said second rack and as a result said second cylindrical member moves away from said first cylindrical member as the travel of input member is less than the travel of the wall during the brake application.

19. The brake booster as recited in claim 18 wherein an output member is characterized by a first piston attached to said first cylindrical member and located in a bore of a master cylinder for creating operational pressurizing fluid in a pressurizing bore of the master to effect a brake application, said first piston having a passage that is connected to said pressurizing bore to receive operational pressurized fluid, and a second piston that is located in said passage and receives said operational pressurized fluid to produce a reaction force that acts on the second end of said second cylindrical members to oppose said input force during a brake application.

20. The brake booster as recited in claim 19 wherein said brake booster is further characterized by said input member moving said first rack in said first longitudinal slot through rotation of said gear to prevent separation of said second cylindrical member from said first cylindrical member and thereby manually move said wall to effect a brake application.

21. A brake booster having a wall that moves within a cavity of a housing in response to a control valve arrangement terminating communication of a first fluid between a first chamber and a second chamber while allowing a second fluid to be communicated to the second chamber to create a pressure differential and thereby produce an output force that is a function of an input force applied to an input member, said output force being transmitted through a hub for said wall to an output member to effect a desired brake application, said brake booster being characterized in that said wall includes a first cylindrical member having a first stepped bore that retains a second cylindrical member with a second stepped bore that retains a shaft that extends from a plunger connected to said input member, said first cylindrical member, second cylindrical member and shaft having longitudinal slots therein with oval openings in said plunger and lateral openings in said second cylindrical member that are normal to said longitudinal slots; a gear having an axle aligned with said lateral openings in said second cylindrical member and with said oval openings in said plunger, a pin that passes through said oval openings and is retained in said lateral openings such that teeth on a peripheral surface of said gear extend through said longitudinal slots and engage a first rack carried by said first cylindrical member and a second rack fixed to said housing, said first cylindrical member and said wall moving together during a brake application such that said first rack imparts a torque on said gear such that said gear rotates about said pin and moves on said second rack and said second cylindrical member separates from said first cylindrical member and as a result the travel of said input member is less than the travel of said output member; and tubular means fixed to said first cylindrical member and sealingly connected to said second cylindrical member such that when said first and second cylindrical members separate said communication is maintained between said first chamber and a seat in said second cylindrical member through which said first chamber is connected to said second chamber.

22. The brake booster as recited in claim 21 wherein said first cylindrical member is characterized by a first passage through which said second chamber is connected to said second fluid.

23. The brake booster as recited in claim 22 wherein said second cylindrical member is characterized by a second passage that receives said tubular means for communicating the first fluid to said seat.

24. A brake booster having a wall that moves within a cavity of a housing in response to a control valve arrangement terminating communication of a first fluid between a first chamber and a second chamber while allowing a second fluid to be communicated to the second chamber to create a pressure differential and thereby produce an output force as a function of an input force applied to an input member, said output force being transmitted through a hub for said wall to an output member to effect a desired brake application, said brake booster being characterized in that said wall includes a first cylindrical member having a first stepped bore that retains a second cylindrical member with a second stepped bore that retains a shaft that extends from a plunger connected to said input member, said first cylindrical member, second cylindrical member and shaft having longitudinal slots therein and oval openings in said plunger and lateral openings in said second cylindrical member that are normal to said longitudinal slots; a gear having an axle aligned with said lateral openings in said second cylindrical member and with said oval openings in said plunger, a pin that passes through said oval openings and is retained in said lateral openings such that teeth on a peripheral surface of said gear extend through said longitudinal slots and engage a first rack carried by said first cylindrical member and a second rack fixed to said housing, said first cylindrical member and said wall moving together during a brake application such that said first rack imparts a rotative torque that rotates said gear about said pin and moves said gear on said second rack such that said second cylindrical member separates from said first cylindrical member and as a result the travel of said input member is less than the travel of said output member; and tubular means fixed to said first cylindrical member and sealingly connected to said second cylindrical member such that with separation of said second cylindrical member and said first cylindrical member communication is maintained between said first chamber and a seat in said second cylindrical member.

25. The brake booster as recited in claim 24 wherein a ratio of travel of said input member and said output member is proportional to said input force and said output force.

* * * * *